M. C. HOLMES.
Chuck.

No. 202,260.   Patented April 9, 1878.

WITNESSES.
William L Coop
Joseph A. Miller Jr

INVENTOR.
Milton C. Holmes
by Joseph A. Miller
Attorney

UNITED STATES PATENT OFFICE.

MILTON C. HOLMES, OF WOONSOCKET, RHODE ISLAND.

IMPROVEMENT IN CHUCKS.

Specification forming part of Letters Patent No. 202,260, dated April 9, 1878; application filed November 7, 1877.

*To all whom it may concern:*

Be it known that I, MILTON C. HOLMES, of Woonsocket, in the county of Providence and State of Rhode Island, have invented new and useful Improvements in Chucks; and I hereby declare that the following is a full, clear, and exact description of the same, reference being had to the accompanying drawings, forming part of this specification.

This invention has reference to that kind of chuck known as a "drill-chuck;" and consists in the novel arrangement and construction of the parts, by which a chuck with adjustable independent jaws is secured, in which a drill or other similar article can be accurately centered or placed any required distance out of the center, and be firmly held and readily adjusted, as will be more fully set forth hereinafter.

Figure 1:
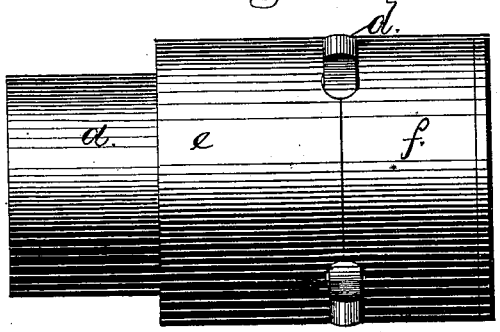
Figure 2:
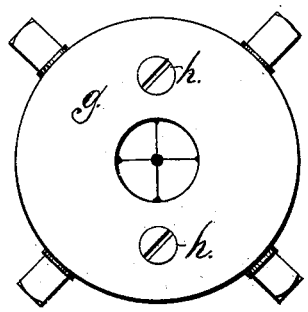
Figure 3:
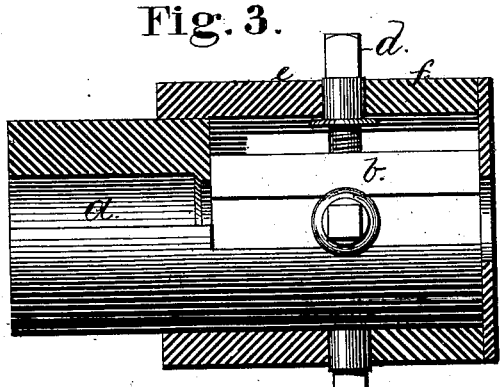
Figure 4:
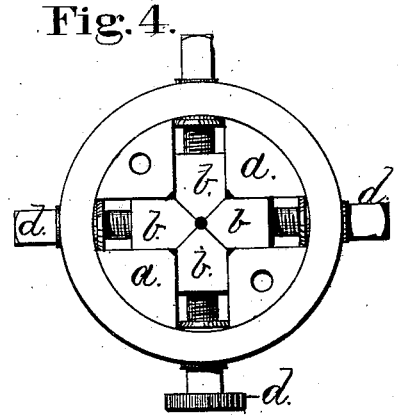
Figure 5:
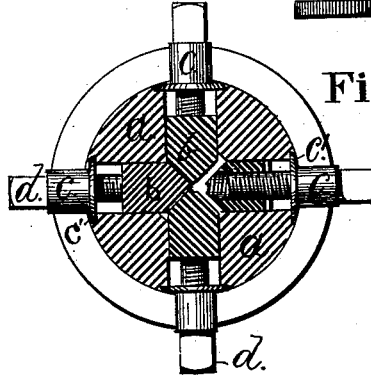
Figure 6:
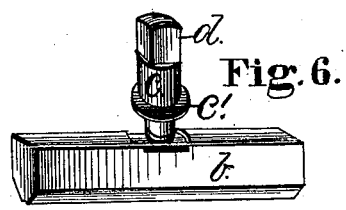

Figure 1 is a side view of my improved chuck, and Fig. 2 an end view. Fig. 3 is a sectional view, and Fig. 4 an end view, with the front plate removed. Fig. 5 is a cross-section, showing the jaws, the slots in which they move, and the screws by which they are adjusted and held. Fig. 6 is a perspective view of one of the jaws.

In the drawings, $a$ is the chuck-tube, one end of which is secured in the lathe, and the other end provided with three or four slots, in which the jaws $b\ b$ may be made to slide to or from the center. $c\ c$ are the screws by means of which the jaws are adjusted and held.

The screws $c\ c$ are tapped into the jaws, and are provided with the collars $c'$, and with either or both a wrench-head or thumb-piece, $d$. $e$ is a sleeve, covering the rear portion of the slotted chuck-tube, extending to the center of the adjusting-screws $c$. $f$ is another sleeve, covering the forward part of the slotted chuck-tube; and $g$ is the front plate, secured by the screws $h\ h$.

The jaws have a long and firm bearing. Each jaw can be adjusted separately, and a drill or similar article secured in any desired position and firmly held. The sleeves $e$ and $f$, with the end plate $g$, cover and protect all the parts from dirt and injury. By removing the end plate $g$, the sleeve $f$ and the jaws $b\ b$ may be removed and other jaws arranged for special work substituted.

The construction of this chuck is simple, combining strength with lightness, and for work requiring nice adjustment this chuck fills a long-felt want.

Having thus described my invention, I claim as new and desire to secure by Letters Patent—

The chuck consisting of the tube $a$, the front end of which is slotted to receive the jaws $b\ b$, (three or four of them,) and the sleeves $e\ f$ and front plate $g$, arranged to secure and protect the parts, and the adjusting-screws $c$, arranged and operating substantially as and for the purpose described.

MILTON C. HOLMES.

Witnesses:
JOSEPH A. MILLER,
D. B. POTTER.